Dec. 30, 1941.  H. A. ANDRESEN  2,268,006

TEMPERATURE INDICATOR

Filed July 24, 1939

Inventor:
Hilmar A. Andresen,
By: Bair & Freeman
Attorneys.

Patented Dec. 30, 1941

2,268,006

UNITED STATES PATENT OFFICE 2,268,006

TEMPERATURE INDICATOR

Hilmar A. Andresen, Chicago, Ill., assignor to E. Edelmann & Co., Chicago, Ill., a corporation of Illinois Application July 24, 1939, Serial No. 286,264

5 Claims. (Cl. 73—367)

An object of my invention is to provide a temperature indicator which may be attached to a tank of liquid or the like over an opening in the tank, to provide a temperature responsive element carried by the indicator in direct contact with the liquid, and to provide a partition wall outside of the temperature responsive element with an indicator needle outside of the partition wall and operable to show the position of the temperature responsive element and thereby the temperature of the liquid within the tank.

Another object is to provide a transmission means of simple and inexpensive construction for transmitting motion from the temperature responsive element inside the partition wall to the indicator needle outside of the wall, such transmission being of magnetic type.

Still another object is to provide a very simple mounting for the temperature responsive element and for a bar magnet on the inside of the partition wall, the magnet being carried and supported solely by a coiled bimetal temperature responsive element.

A further object is to provide a temperature indicator in the form of a casing, the periphery of which is sealed over an opening in a tank of liquid or the like, the temperature of which is to be indicated, the casing having a partition wall and an indicia plate and cover means such as a sight glass for the outer end of the casing to enclose the indicating needle on the outside of the partition wall.

With these and other objects in view, my invention consists in the construction, arrangement and combination of the various parts of my device whereby the objects contemplated are attained, as hereinafter more fully set forth, pointed out in my claims and illustrated in the accompanying drawing. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawing, in which:

Figure 1:
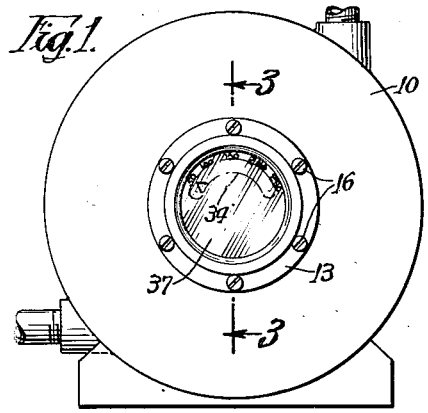
Figure 1 is an end elevation of a tank showing my temperature indicator mounted thereon.
Figure 4:
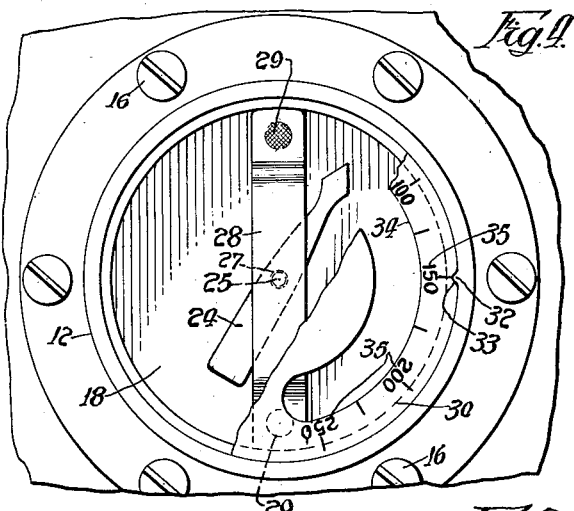
Figure 4 is a front elevation of my indicator, enlarged as in Figure 3 and having a sight glass and a retainer rim removed and a portion of an indicia disc broken away to show constructional features.
Figure 2:
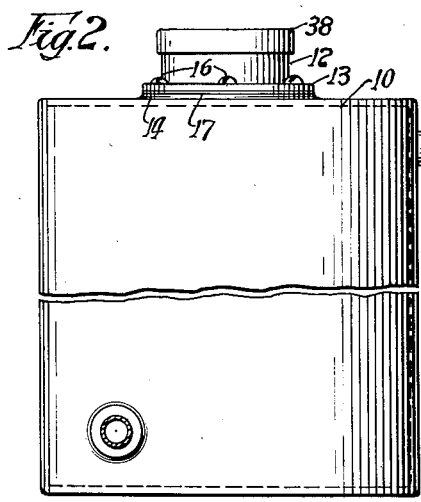
Figure 2 is a plan view of the same.
Figure 3:
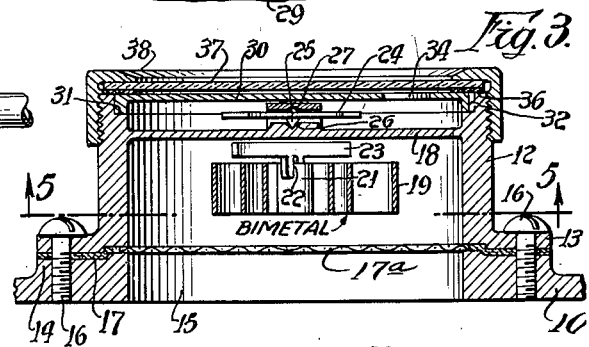
Figure 3 is an enlarged sectional view on the line 3—3 of Figure 1.
Figure 5:
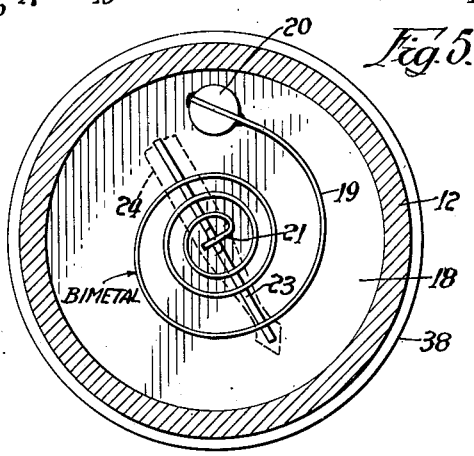
Figure 5 is a sectional view of my indicator on the line 5—5 of Figure 3.
Figure 6:
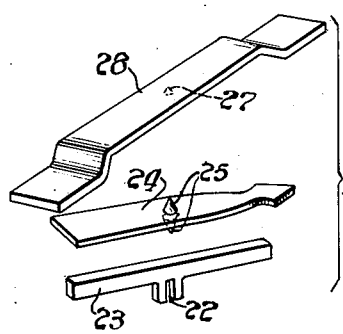
Figure 6 is an exploded perspective view of an indicator needle, a bar magnet and a mounting yoke, which are part of my invention.

On the accompanying drawing, I have used the reference numeral 10 to indicate a tank adaptable for containing liquid or the like which may or may not be under pressure. My indicator includes a casing 12 having an annular out-turned flange 13. The flange 13 is secured to a boss 14 on the end of the tank 10 surrounding an opening 15 therein. Screws 16 extend through the flange 13 and are threaded into the boss 14 for the purpose of mounting the casing 12 on the tank. A gasket 17 is interposed between the flange 13 and the boss 14 to effect sealing of the casing 12 relative to the tank 10.

The casing 12 includes a partition wall 18 which is made of suitable non-magnetic material or one which does not interfere with the transmission of magnetism therethrough. The wall 18, by way of example, may be made of brass and formed integral with the casing 12 as illustrated.

A temperature responsive element 19 is provided inside the wall 18. The element 19 preferably takes the form of a coiled strip of bimetal having one end anchored as by solder or brazing in a post 20 extending inwardly from the wall 18. The other end of the temperature responsive element 19 (indicated at 21) is secured in a slot 22 of a bar magnet 23. The slot 22 is arranged intermediate the ends of the bar magnet 23 whereby rotation of the inner end 21 of the temperature responsive element 19 as caused by coiling or uncoiling of the element will result in rotation of the bar magnet approximately about the slot 22 as an axis. The bimetal, it will be obvious, is in direct contact with the liquid in the tank and is thereby quickly and accurately responsive to the temperature thereof, regardless of whether or not the liquid is under pressure.

Outside of the wall 18, I provide an indicating needle 24 having needle points 25 to journal it intermediate its ends. The needle points 25 are seated in needle point bearings 26 and 27 carried by the wall 18 and a yoke 28 respectively. The yoke 28 is secured to the wall 18 as by spot welding indicated at 29. The needle point bearings 26 and 27 are substantially coincident with the axis of rotation of the bar magnet 23 and the bar magnet as well as the needle 24 are closely adjacent opposite sides of the partition wall 18.

The indicating needle 24 is magnetized so that its opposite ends are attracted by the opposite ends of the bar magnet 23 and thus, whenever the bar magnet rotates as a result of temperature changes, the indicating needle rotates in synchronism therewith.

So that the needle 24 may be used to indicate temperature of the liquid, I provide an indicia disc 30 seated in an annular rabbet 31 of the casing 12. The disc 30 is retained in proper position circumferentially of the casing 12 by lug and notch means indicated at 32—33. A slot 34 is provided in the indicia disc 30 and indicia characters 35 are suitably impressed on the disc adjacent the slot so as to cooperate with the needle and thereby give an indication of the temperature to which the device is at any time responsive.

An annular gasket 36 is placed against the outer end of the casing 12 and against the outer marginal edge of the indicia disc 30, against which is mounted a transparent cover plate 37 of glass or the like. A rim 38 is screw-threaded on the casing 12 and cooperates with the marginal edge of the glass 37 to retain it in position and the gasket 36 compressed so as to exclude dust and dirt from the casing exterior of the wall 18 where it might interfere with the free rotation of the indicator needle 24.

From the foregoing description, it is obvious that I have provided a temperature indicator that can be economically manufactured and which is assembled of a few simple parts. The temperature responsive element itself is in direct contact with the liquid, the temperature of which is to be indicated, and is therefore responsive to any changes in its temperature. The mounting of the bar magnet 23 so that it is entirely supported by the bimetal element eliminates any inaccuracies of temperature indication or lagging of the rotation of the bar magnet behind the rotation of the bimetal element because of friction. By providing the indicating needle 24 mounted with needle point bearings, it is freely movable with a minimum of friction. Accordingly, a high degree of accuracy is thereby obtained. The magnetism of the bar magnet 23 passes readily through the partition wall 18 and the north and south poles of the indicating needle are automatically and continuously held in alignment with the respective south and north poles of the bar magnet 23. The result is an effective transmission of movement from the temperature responsive element to its indicating needle without the necessity of packing glands or other friction producing devices that would be detrimental to accurate response of the needle to the changes in temperature, where it is desirable to have the temperature responsive element inside a tank and the indicating needle outside thereof.

It is also obvious that there is no lag in the operation of my temperature indicator. Any changes in the position of the temperature responsive element are immediately indicated by the indicating needle, and this is true whether or not the magnets 23 and 24 are full strength or have lost a portion of their magnetism. To obviate the possibility or irregularity in action by more weight at one end than the other, the magnets 23 and 24 are preferably of the same length or weight on each side of their pivotal axis. It is also desirable, although not necessary, that the bimetal 19 be of non-magnetic material to eliminate any possibility of false response of the indicating needle 24 to the changes in position thereof. Likewise, the bracket 28 should be of non-magnetic material, such as brass, and can be either spot welded, as already referred to, or connected in any other suitable manner to the partition 18.

In order to prevent the possibility of tools or other foreign objects from the inside of the tank 10 from contacting with the bimetal element 19, I provide a screen 17a spanning the casing 12. The screen 17a will permit liquid to readily pass through and affect the bimetal element but will prevent contact of any foreign objects in the liquid with the bimetal element.

The bimetal element is preferably made somewhat heavy so that it has sufficient power to readily move the magnet 23 against the resistance of a heavy medium in the tank 10, such as when the tank is used to contain grease or the like.

The disc 30 is preferably made of soft iron or similar material so that it serves as a shield against outside magnetic influence on the magnetized indicating needle 24. This eliminates the possibility of a false reading due to the presence of an extraneous magnet or mass of iron or the like adjacent the indicator. My construction also obviates any trouble that might be experienced where a temperature responsive element is mounted inside a tank containing liquid under pressure, which pressure would give a false reading of a temperature indicator of the diaphragm type, such as shown and described in my patent No. 2,256,007.

Having described one specific embodiment of my invention together with the operation thereof, I desire it to be understood that this form is selected merely for the purpose of facilitating disclosure of the invention rather than for the purpose of limiting the number of forms which it may assume. It is to be further understood that various modifications and alterations may be applied to the specific form disclosed to meet the requirements of practice without in any manner departing from the spirit and scope of the present invention except as set forth in the claims appended hereto.

I claim as my invention and desire to secure by Letters Patent of the United States:

1. In a temperature indicator, a casing having an open inner end, means for mounting said casing on a tank with said open inner end over an opening therein, means for sealing said casing relative to said tank, said casing including a wall of non-magnetic material, a temperature responsive element supported inside of said casing, an elongated magnet carried thereby in a position adjacent said wall, said temperature responsive element being operable to rotate said elongated magnet about an axis intermediate its ends upon a change of temperature in the tank directly effecting a change in the position of said temperature responsive element, an indicating needle outside of said wall and responsive to movement of said magnet, journal points carried by said indicating needle, a bearing on said wall for one of said points, a yoke on said wall having a bearing for the other of said points.

2. In a temperature indicator of the character described, a casing including a partition wall of non-magnetic material, a bracket thereon, and having a portion spaced therefrom, a temperature responsive element supported on one side of said wall and thereby responsive to temperature changes on said side, a magnet carried and entirely supported by said temperature responsive element in a position adjacent said wall, said temperature responsive element being operable to rotate said magnet about an axis intermediate its ends upon a change of temperature effecting a change in the position of said temperature responsive element and an indicating needle between said wall and said bracket, said needle having needle point bearings journaled in said wall and in said bracket on the opposite side of the wall from said magnet, said indicating needle being responsive to movements of said magnet and thereby indicating the changes in temperature affecting said temperature responsive element.

3. A temperature indicator of the class disclosed comprising a casing, means for mounting said casing over an opening in a tank of liquid or the like, said casing including a wall through which magnetism may freely pass, means for sealing said casing and wall relative to said tank, a post extending inwardly from said wall, a coiled bimetal element having one end anchored to said post, a bar magnet supported by the other end of said bimetal element in a position adjacent said wall, said bimetal element effecting rotation of said bar magnet on an axis intermediate its ends upon coiling and uncoiling of said bimetal element as a result of temperature changes of the liquid in said tank, a magnetized indicating needle journaled adjacent said wall and on the outside thereof, the axes of said needle and magnet being substantially coincident and transparent cover means for the outer end of said casing to enclose said indicating needle.

4. A temperature indicator for a tank, said indicator comprising a casing, said casing including a wall through which magnetism may freely pass, means for sealing said casing and wall relative to said tank, a post extending from said wall, a coiled bimetal element having one end anchored to said post, a bar magnet supported by the other end of said bimetal element in a position adjacent said wall, said bimetal element effecting rotation of said bar magnet on an axis intermediate its poles upon coiling and uncoiling of said bimetal element as a result of temperature changes of the liquid in said tank, and an indicating needle journaled adjacent said wall, on the outside thereof and responsive to movements of said bar magnet.

5. A temperature indicator of the class disclosed comprising a casing having an open side, means for mounting said casing over an opening in a tank of liquid or the like with said open side toward the interior of the tank, a screen on said open side of said casing, said casing including a wall through which magnetism may freely pass, means for sealing said casing and wall relative to said tank, a coiled bimetal element having an end anchored to said casing, a bar magnet supported by the other end of said bimetal element in a position adjacent said wall, said bimetal element effecting rotation of said bar magnet on an axis intermediate its ends upon coiling and uncoiling of said bimetal element as a result of temperature changes of the liquid in said tank, and an indicating needle responsive to the movement of the bar magnet and journaled adjacent said wall and on the outside thereof.

HILMAR A. ANDRESEN.